Oct. 2, 1928. Re. 17,091

H. J. KASCH

MEANS FOR SECURING KNOBS AND DIALS TO INSTRUMENT SHAFTS

Original Filed July 3, 1924

Inventor

Henry J. Kasch

By H. P. Walker

Attorney

Reissued Oct. 2, 1928.

Re. 17,091

UNITED STATES PATENT OFFICE.

HENRY J. KASCH, OF DAYTON, OHIO, ASSIGNOR TO KURZ-KASCH COMPANY, OF SOUTH BROADWAY, NEAR DAYTON, OHIO, A CORPORATION OF OHIO.

MEANS FOR SECURING KNOBS AND DIALS TO INSTRUMENT SHAFTS.

Original No. 1,563,635, dated December 1, 1925, Serial No. 723,951, filed July 3, 1924. Application for reissue filed January 28, 1926. Serial No. 84,522.

The invention relates to new and useful improvements in means for securing knobs and dials to instrument shafts, and more particularly to means for securing a knob and a dial to a cylindrical shaft or spindle, in radio apparatus.

It is one of the principal objects of my invention to provide a loose member, such as a tapered bushing, for firmly securing a knob and dial, or a knob, on an instrument shaft. In those cases where the knob and dial are made integral and secured in position on the shaft by set screws, the operation of the latter is difficult because of their inaccessible positions. These set screws also give the device a rough appearance.

My loose gripping member, which may take the form of a tapered split bushing, will not only close in tightly upon the shaft when the knob is turned, but will not mar the appearance of the device because of its entirely concealed position therein. It will also present a large gripping or contact surface to the shaft.

In radio apparatus especially, my loose bushing will obviate the necessity of carrying dials with different sized holes in stock, for only bushings with different sized holes need be kept on hand with dials having a one-sized hole to receive them. Thus, since different sized holes can be formed in the bushing to accommodate different diameter shafts, it becomes a more economical proposition to carry bushings with different sized holes in stock to fit shafts of different diameters, than to carry different dials with the bushings molded in as at present.

My loose tapered bushing may also be provided with a key to engage the shaft, or it may be made solid, with holes provided to receive balls that engage the shaft. In any event, my method of pulling on the bushing to cause it, or the key, or the balls to close in on the shaft is more advantageous than the set screw or other methods now employed for securing a knob and a dial, or a knob, to an instrument shaft.

Figure 1:
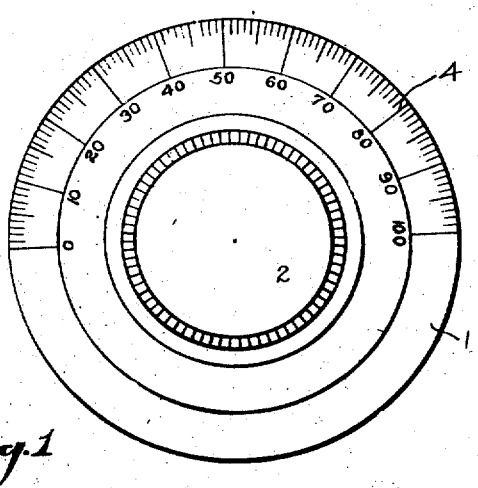
Figure 2:
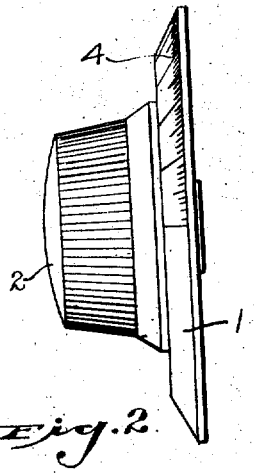
Figure 3:
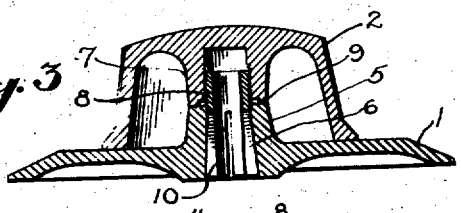
Figure 4:
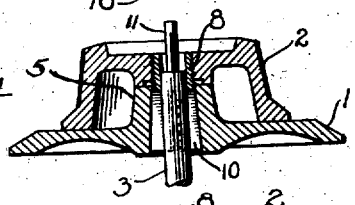
Figure 7:
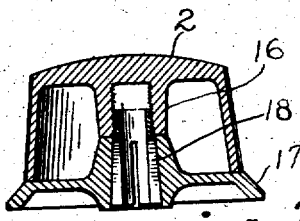
Figure 5:
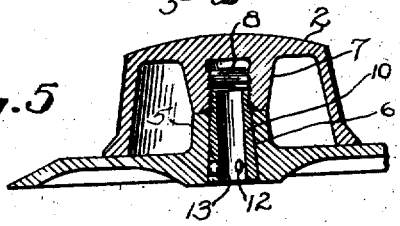
Figure 6:
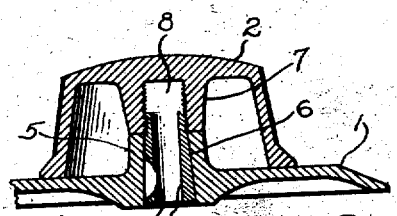

In the accompanying drawings, Fig. 1 is a front view of a combined knob and dial embodying my improvements. Fig. 2 is a side view thereof. Figure 3 is a central sectional view taken through the same, showing the loose tapered split bushing. Figure 4 is a central sectional view taken through another type of my device. Figure 5 is a central sectional view taken through a combined knob and dial employing my ball type of loose bushing. Figure 6 is a central sectional view taken through a combined knob and dial employing my loose tapered bushing in conjunction with a Woodruff key. And Figure 7 is a central sectional view taken through a two part knob employing my loose split bushing that is closed in against the shaft by turning the outer part of the knob when the inner part is held stationary.

Referring to the accompanying drawings for a detailed description of the different forms of embodiment of my invention, the numeral 1 designates a dial, and 2 a knob, for adjusting a spindle or shaft 3 of any type, but more particularly that of a radio instrument. (See Figures 1, 2 and 3.) The extent of this adjustment is determined by a series of graduations 4, formed on the outer periphery of the dial. The latter may be made of bakelite, metal, a rubber composition or any other suitable substance, and has an integral hub or axial extension 5, in which there is formed a tapering axial hole 6.

The knob 2, which is preferably made of bakelite or the like, is formed with an inner tubular extension 7 having an axial hole 8, which is threaded at its inner end. The tubular extension 7 terminates at its inner end in an annular flange 9 adapted to engage the hub portion 5 of the dial 1, with its hole 8 in registry with the axial hole 6 in said hub portion of the dial to receive the outer externally threaded end of a loose tubular member such as the bushing 10. The inner part of this bushing is, in this instance, tapering and split to close in against the shaft 3, which it receives, when the knob 2 is turned and the dial is held stationary. Thus, when the knob 2 is rotated, the bushing 10 will have its tapering outer surface drawn against the tapering wall of the hole 6 in the hub portion 5 of the dial 1, to contract against the shaft 3 to firmly secure the knob and dial on the shaft without the use of an unsightly and inconvenient set screw.

In Figure 4 I have illustrated a vernier type knob, through the face of which the hole 8 extends to receive a vernier shaft 11. The bushing 10 shown in this figure and in Figure 3, has its tapered portion split to enable it to close in readily against the shaft 3 when the knob is turned, but in the case now to be described the loose bushing may be formed without the slits in its tapered portion.

Referring to Figure 5, it will be noted that the loose bushing 10 is not split, but has formed around the inner edge of its tapering portion, a number of holes 12, which are counterbored to receive and retain balls 13 which project through the inner reduced orifices of such counterbored holes, so that when the knob is turned as before described, the balls will engage the shaft 3 to firmly secure the dial and knob thereon. In other words, when the knob 2 is turned, the tapering portion of the bushing will be drawn against the tapered wall of the hole 6 in the dial 1 to force the balls 13 into clutching engagement with the shaft.

In Figure 6 the tapered loose bushing 10 is not split, but is formed with an inner concave hole to receive a Woodruff key 14, which when the knob is turned as before, will engage the shaft 3. In other words, when the knob 2 is turned, the tapered portion of the bushing will be drawn against the tapered wall of the hole 6 in the dial, to force the key 14 into clutching engagement with the shaft, thereby to hold the knob and dial firmly on the latter.

In Figure 7, I have shown a knob, which is made in two parts, the outer part 15 having an inner tubular extension 16, which is internally threaded, and the inner part 17 having a tapering axial hole. When the outer part 15 of the knob is placed upon its inner part 17, as in Figure 7, a loose bushing 18 having its outer end externally threaded and its inner end tapering and split, may be forced through the axial hole in the inner part 17 of the knob to receive a shaft 19. The outer knob part 15 may then be screwed on the outer threaded portion of the bushing 18, to draw its tapering portion against the tapered wall of the axial hole in the inner knob part 17, to cause the split tapering portion of the bushing to firmly clutch the shaft 18 and thereby firmly secure both knob parts upon the shaft.

While the invention has been illustrated as applied to a circular dial carrying a series of graduations for cooperation with a stationary gage mark or pointer, it is to be understood that it is applicable to a contrary construction wherein a pointer member is to be connected upon the shaft or spindle for cooperation with a stationary series of graduations.

Having described my invention, I claim:

1. In a device of the type described, the combination with a shaft, of a knob and a dial for conjoint use in turning the shaft, the dial having a tapering axial hole and the knob having a tubular extension adapted to be brought over said hole, a loose bushing having a tapered, split end adapted to be contracted within said hole, and having its opposite end threaded for connection with the tubular extension on the knob, whereby when the knob is turned, the tapered end of the bushing will be contracted tightly about the shaft, for the purpose specified.

2. The combination of an indicator member having a hub provided with a tapered bore converging outwardly toward the front face of the indicator member, a tapered split bushing fitted within the tapered bore and terminating at its outer and small end in an exteriorly screw threaded extension projecting beyond said hub, and an adjusting member screw threaded upon said extension and bearing upon the hub to draw the tapered bushing toward the front face of said indicator member into the tapered bore of such hub, thereby contracting such split bushing into engagement with a stem surrounded by the bushing.

3. Means for engaging an indicator and adjustment knob with the spindle of a radio device or the like, including an outwardly converging conical bushing longitudinally slotted and compressible into clamping engagement with the spindle which extends within the bushing, said conical slotted bushing terminating in a screw threaded neck at its apex extremity, an indicator member having an outwardly converging opening therein, through which the conical bushing extends, and an adjusting member at the outer side of said indicator, having screw threaded engagement with such neck and bearing upon the indicator member to contract the bushing upon the spindle by drawing such slotted conical bushing longitudinally outwardly within the opening in the indicator member.

4. Means for connecting an indicator and adjustment knob with each other and with a spindle of a radio apparatus or the like having a spindle to be rotated, of an indicator member to be carried by the spindle, an independent knob detachably engageable therewith, with which to rotate the indicator and spindle and an outwardly converging adjustable coupling sleeve surrounding the spindle and extending through an opening in the indicator member, and a screw threaded extremity on said coupling sleeve projecting beyond the front face of the indicator member, and having operative engagement with the knob by the adjustment of which the coupling sleeve is caused to exert simultaneously contractive gripping pressure upon the spindle and expansive pressure within the opening of the indicator member to engage said spindle and indicator member in their relative positions of revoluble adjustment.

5. Means for connecting an indicator and adjustment knob with each other and with a spindle of a radio apparatus or the like, having a spindle to be rotated, of an indicator member, an adjusting knob and a slotted tapered coupling sleeve, each independently revoluble in relation with the spindle and in relation with each other, said coupling sleeve being axially adjustably engaged in a central opening in the indicator member and having a screw threaded extremity projecting forwardly beyond the front face of the indicator member, with which the knob is interengaged, the axial adjustment of the sleeve relative to the indicator member, subjecting the spindle to contractive gripping engagement and the indicator member to expansive engagement by the coupling sleeve.

6. Means for connecting an indicator with a spindle of a radio apparatus and the like, comprising a revoluble indicator having radially disposed indicating means formed integral with the head, an independent adjusting knob for said indicator, and a coupling member adjustably engageable with a shaft to be rotated, comprising a conical bushing independent of said indicator, screw threaded at its smaller end and longitudinally slotted at its larger end, the indicator having therein a tapered central opening in which the slotted portion of the bushing engages with its screw threaded smaller end projecting through and beyond the front face of the rotary indicator and into engagement with the adjusting knob, said coupling member being operatively engaged with the shaft and the rotary indicator by the axial adjustment of the coupling member relative thereto to maintain said parts in fixed relation with each other by the relative adjustment of the knob.

7. Means for connecting an indicator with a spindle of a radio apparatus and the like, comprising an indicator formed from phenolic condensation material, an independently formed knob for rotating the indicator and clutch means projecting beyond the front face of said indicator for fixedly securing the indicator upon the shaft to be rotated, comprising a conical bushing screw threaded at its smaller end, and longitudinally slotted at its larger end, said indicator having therein a tapered opening in which the slotted portion of the clutch is seated and wherein it is contracted upon the engaged shaft by relative axial adjustment of the indicator and conical bushing, said knob having screw threaded engagement with the smaller end of said conical, said clutch means, and abutting upon said indicator.

8. Means for securing knobs and dials to instrument shafts of radio apparatus and the like, including an indicator molded from phenolic condensation material or the like, comprising a head portion having a central orifice and an indicating means carried thereby in radially disposed relation upon the head, said head having therein a tapered opening, a conical clutch element engageable with the shaft to be rotated and axially adjustable within the tapered opening, said conical clutch element being screw threaded at its smaller extremity and a coacting member having screw threaded engagement with such smaller end of the clutch element and abutting upon the indicator to relatively adjust the indicator and clutch element in an axial direction to effect clutching engagement upon the shaft to be rotated.

9. Means for connecting an indicator with a spindle of a radio apparatus and the like, comprising an indicator member molded from phenolic condensation material or the like, having a projecting hub provided with a conical bore, converging forwardly from its rear toward its forward side, a contractible bushing within the conical bore and projecting beyond the front face of said indicator member, and means engageable with the forward projecting portions of said contractible bushing for drawing the bushing axially relative to the indicator member in a forwardly direction, for contracting said bushing upon a shaft inserted therein to lock the indicator member in fixed relation therewith.

10. Means for securing knobs and dials to instrument shafts of radio apparatus and the like, including an indicator member molded from phenolic condensation material having a projecting hub provided with a conical bore converging from its rear toward its front face, and open at its opposite ends for the reception of a shaft clutching device.

11. As an article of manufacture, a coupling member for securing an indicator in fixed position upon a revoluble shaft, comprising an exteriorly tapered contractible sleeve engageable within a conical bore, of an indicating member, said tapered sleeve having at its smaller end, an exteriorly screw threaded neck projecting beyond the front face of the indicating member for engagement with an adjusting member, by which the tapered sleeve is axially adjustable relative to the indicator, the tapered portion of the sleeve being longitudinally slotted from the larger terminal thereof to a point in proximity to the screw threaded neck.

12. Means for securing knobs and dials to instrument shafts of radio apparatus and the like, including an indicator for radio apparatus and the like, including an exteriorly tapered sleeve terminating at its smaller end in an exteriorly threaded neck, the sleeve being longitudinally slotted from the larger end to a point in proximity to the threaded neck, an indicator member having therein a conical bore converging forwardly from its rear to its forward face, in which the tapered sleeve has expansive wedging pressure, upon forward longitudinal movement, and an independent adjusting member having screw threaded engagement with the threaded neck of said sleeve at the forward side of said indicator member, by the adjustment of which the sleeve is adjusted axially in a forwardly direction relative to the indicator member, and thereby contracted within the tapered bore into gripping engagement with a shaft to be turned.

In testimony whereof, I have hereunto set my hand this 22nd day of January, 1926.

HENRY J. KASCH